United States Patent
Fukuda et al.

(10) Patent No.: US 11,271,447 B2
(45) Date of Patent: Mar. 8, 2022

(54) STATOR FOR ROTATING ELECTRIC MACHINE HAVING COIL SUPPORT MEMBERS FOR STATOR CORE

(71) Applicant: HITACHI AUTOMOTIVE SYSTEMS, LTD., Hitachinaka (JP)

(72) Inventors: Tomohiro Fukuda, Hitachinaka (JP); Shinji Yamazaki, Hitachinaka (JP)

(73) Assignee: HITACHI ASTEMO, LTD., Ibaraki (JP)

(*) Notice: Subject to any disclaimer, the term of this patent is extended or adjusted under 35 U.S.C. 154(b) by 11 days.

(21) Appl. No.: 16/754,622

(22) PCT Filed: Sep. 7, 2018

(86) PCT No.: PCT/JP2018/033127
§ 371 (c)(1),
(2) Date: Apr. 8, 2020

(87) PCT Pub. No.: WO2019/073724
PCT Pub. Date: Apr. 18, 2019

(65) Prior Publication Data
US 2020/0358329 A1   Nov. 12, 2020

(30) Foreign Application Priority Data
Oct. 11, 2017   (JP) .............................. JP2017-198075

(51) Int. Cl.
*H02K 3/34*   (2006.01)
*H02K 1/16*   (2006.01)
(Continued)

(52) U.S. Cl.
CPC .............. *H02K 3/345* (2013.01); *H02K 1/16* (2013.01); *H02K 1/165* (2013.01); *H02K 3/04* (2013.01);
(Continued)

(58) Field of Classification Search
CPC .. H02K 1/16; H02K 3/04; H02K 3/14; H02K 3/28; H02K 3/30; H02K 3/34;
(Continued)

(56) References Cited

U.S. PATENT DOCUMENTS 9,118,224 B2* 8/2015 Okimitsu ................. H02K 3/12
2008/0191574 A1* 8/2008 Tokizawa ................. H02K 3/12
310/179

(Continued)

FOREIGN PATENT DOCUMENTS

JP    2007-312549 A    11/2007
JP    2016-032392 A    3/2016
(Continued)

OTHER PUBLICATIONS

Suematsu et al., English Machine Translation of JP 2016093055 (Year: 2016).*

(Continued)

*Primary Examiner* — Rashad H Johnson
(74) *Attorney, Agent, or Firm* — Volpe Koenig (57) ABSTRACT

This object is to secure a creepage insulation distance and improve insulation reliability. A stator core is formed as a housing, and is configured such that storage spaces for storing a plurality of segment coils are formed on an inner circumferential side of the housing in an axial direction of the housing and a plurality of the storage spaces is formed at intervals on the inner circumferential side of the housing. A plurality of coil support members is formed as annular members, and supports the plurality of segment coils. The coil support members each include a plurality of through-holes for inserting the segment coils, which is openings connected to the storage spaces, are separately disposed at both ends of the stator core in the axial direction, and each (Continued)

cover the inner circumferential side of the end portion of the stator core in the axial direction.

6 Claims, 8 Drawing Sheets

(51) Int. Cl.
    *H02K 3/04*     (2006.01)
    *H02K 3/52*     (2006.01)
    *H02K 3/14*     (2006.01)
    *H02K 3/28*     (2006.01)
    *H02K 11/25*     (2016.01)
    *H02K 3/38*     (2006.01)
    *H02K 3/50*     (2006.01)
    *H02K 3/30*     (2006.01)

(52) U.S. Cl.
    CPC .................. *H02K 3/34* (2013.01); *H02K 3/14* (2013.01); *H02K 3/28* (2013.01); *H02K 3/30* (2013.01); *H02K 3/38* (2013.01); *H02K 3/50* (2013.01); *H02K 3/52* (2013.01); *H02K 3/525* (2013.01); *H02K 11/25* (2016.01)

(58) Field of Classification Search
    CPC ............ H02K 3/345; H02K 3/38; H02K 3/50; H02K 3/52; H02K 3/525; H02K 11/25; H02K 1/165
    USPC ......................................... 310/40 R, 208, 219
    See application file for complete search history.

(56) References Cited

U.S. PATENT DOCUMENTS

| | | | | |
|---|---|---|---|---|
| 2009/0289520 | A1* | 11/2009 | Takeshita | H02K 3/487 310/214 |
| 2012/0319522 | A1* | 12/2012 | Ikeda | H02K 3/32 310/201 |
| 2012/0326554 | A1* | 12/2012 | Kinpara | H02K 15/024 310/216.004 |
| 2015/0229174 | A1* | 8/2015 | Tokizawa | H02K 3/12 310/208 |
| 2016/0043605 | A1* | 2/2016 | Mizutani | H02K 1/16 310/45 |
| 2016/0190891 | A1* | 6/2016 | Masugi | H02K 3/38 310/201 |
| 2016/0276887 | A1* | 9/2016 | Watanabe | H02K 3/50 |
| 2017/0005537 | A1 | 1/2017 | Matahira et al. | |
| 2017/0040784 | A1* | 2/2017 | Kawanishi | H02G 15/043 |
| 2017/0117780 | A1* | 4/2017 | Hirao | H02K 15/085 |
| 2017/0141635 | A1* | 5/2017 | Iki | H02K 3/28 |
| 2017/0201133 | A1* | 7/2017 | Hattori | H02K 3/38 |
| 2019/0393740 | A1* | 12/2019 | Yokoi | H02K 1/165 |
| 2020/0126694 | A1* | 4/2020 | Kaneko | H01B 3/30 |
| 2020/0127518 | A1* | 4/2020 | Azusawa | H02K 3/34 |
| 2020/0135360 | A1* | 4/2020 | Maeda | H01B 3/306 |
| 2020/0161926 | A1* | 5/2020 | Horii | H02K 21/22 |
| 2020/0212749 | A1* | 7/2020 | Sung | H02K 15/0421 |
| 2020/0243217 | A1* | 7/2020 | Nakano | H02K 3/02 |
| 2020/0412196 | A1* | 12/2020 | Horii | H02K 3/522 |

FOREIGN PATENT DOCUMENTS

| | | |
|---|---|---|
| JP | 2016-093055 A | 5/2016 |
| JP | 2017-127089 A | 7/2017 |
| WO | 2015-083470 A1 | 6/2015 |

OTHER PUBLICATIONS

International Search Report and English Translation, PCT/JP2018/033127 dated Dec. 25, 2018, 4 pgs.

* cited by examiner

STATOR FOR ROTATING ELECTRIC MACHINE HAVING COIL SUPPORT MEMBERS FOR STATOR CORE

TECHNICAL FIELD

The present invention relates to a stator for a rotating electric machine such as a motor or a generator.

BACKGROUND ART

WO2015/083470A (PTL 1) is a background art of the present technical field. This gazette describes that "a rotating electric machine that achieves both productivity and insulation properties is provided" (see ABSTRACT).

CITATION LIST

Patent Literature

PTL 1: WO 2015/083470 A

SUMMARY OF INVENTION

Technical Problem

Due to the use of the technology described in PTL 1, it is possible to solve a problem that insulation reliability is reduced by which an insulation paper is omitted or torn when a coil is inserted and a coil height after the coil is formed by twisting is unstable. However, since ensuring of a creepage insulation distance is not sufficiently considered, there is a need for improving the insulation reliability.

An object of the present invention is to provide a stator for a rotating electric machine that can ensure a creepage insulation distance and improve insulation reliability.

Solution to Problem

In order to solve the aforementioned problem, according to the present invention, a stator core is formed as a housing, and is configured such that storage spaces for storing a plurality of segment coils are formed on an inner circumferential side of the housing in an axial direction of the housing and a plurality of the storage spaces is formed at intervals on the inner circumferential side of the housing. A plurality of coil support members is formed as annular members, and supports the plurality of segment coils. The coil support members each include a plurality of through-holes for inserting the segment coils, which is openings connected to the storage spaces, are separately disposed at both ends of the stator core in the axial direction, and each cover the inner circumferential side of the end portion of the stator core in the axial direction.

Advantageous Effects of Invention

According to the present invention, a creepage insulation distance can be ensured, and insulation reliability can be improved. Other objects, configurations, and effects will be made apparent in the following descriptions.

BRIEF DESCRIPTION OF DRAWINGS

FIG. 4(a) is a top view, and FIG. 4(b) is a view taken along line A-A of FIG. 4(a).

FIG. 6(a) is a top view, and FIG. 6(b) is a bottom view.

FIG. 7(a) is a top view, and FIG. 7(b) is a bottom view.

DESCRIPTION OF EMBODIMENTS

Hereinafter, embodiments of the present invention will be described.

In the following description, a rotating electric machine for a hybrid electric vehicle will be used as an example of the rotating electric machine. In the following description, an "axial direction" refers to a direction along a rotation axis of the rotating electric machine. A circumferential direction refers to a direction along a rotation direction of the rotating electric machine. A "radial direction" refers to a radius direction (radial direction) with the rotation axis of the rotating electric machine as a center. An "inner circumferential side" refers to a radially inner circumferential side (inner radial side), and an "outer circumferential side" refers to an opposite direction, that is, a radially outer circumferential side (outer radial side).

First, an outline of the embodiment will be described.

The embodiment described herein relates to an insulating member configuration of a stator of the rotating electric machine. The rotating electric machine is roughly divided into a cylindrical stator, and a rotor disposed at a predetermined gap on the inner circumferential side of the stator.

The stator has a plurality of magnetic poles arranged such that polarities are alternately different in the rotation direction, and has a cylindrical stator core, and a plurality of stator coils wound around the stator core. A plurality of slots which penetrates in the axial direction and is arranged in the circumferential direction is formed in the stator core in order to accommodate the stator coils. Each stator coil extends across the plurality of slots separated at predetermined circumferential pitches so as to correspond the plurality of magnetic poles by an extraction line extracted from one end of the slot in the axial direction while extending within each slot in the axial direction.

First Embodiment

Hereinafter, a first embodiment of the present invention will be described with reference to FIGS. 1 to 8.

Figure 1:
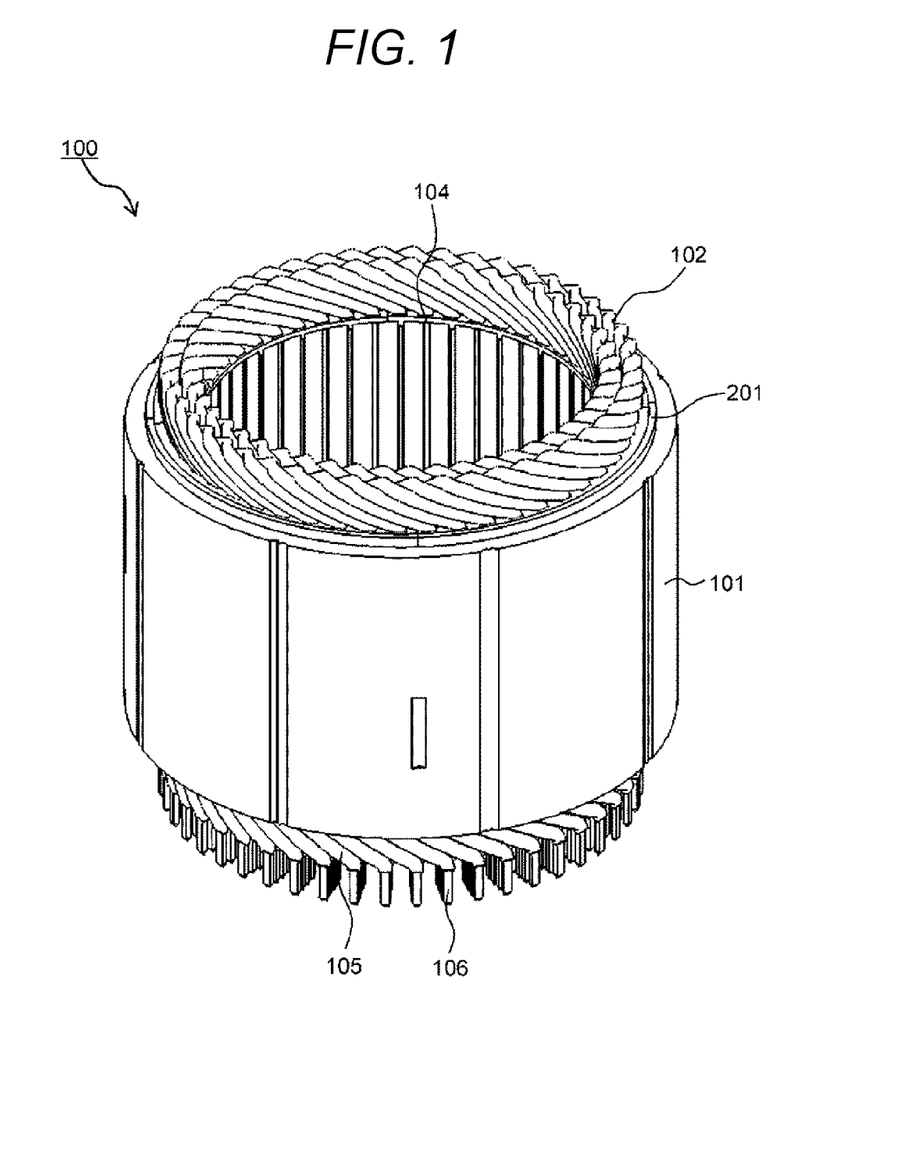
FIG. 1 is a perspective view illustrating a stator of a rotating electric machine according to a first embodiment of the present invention alone.
Figure 2:
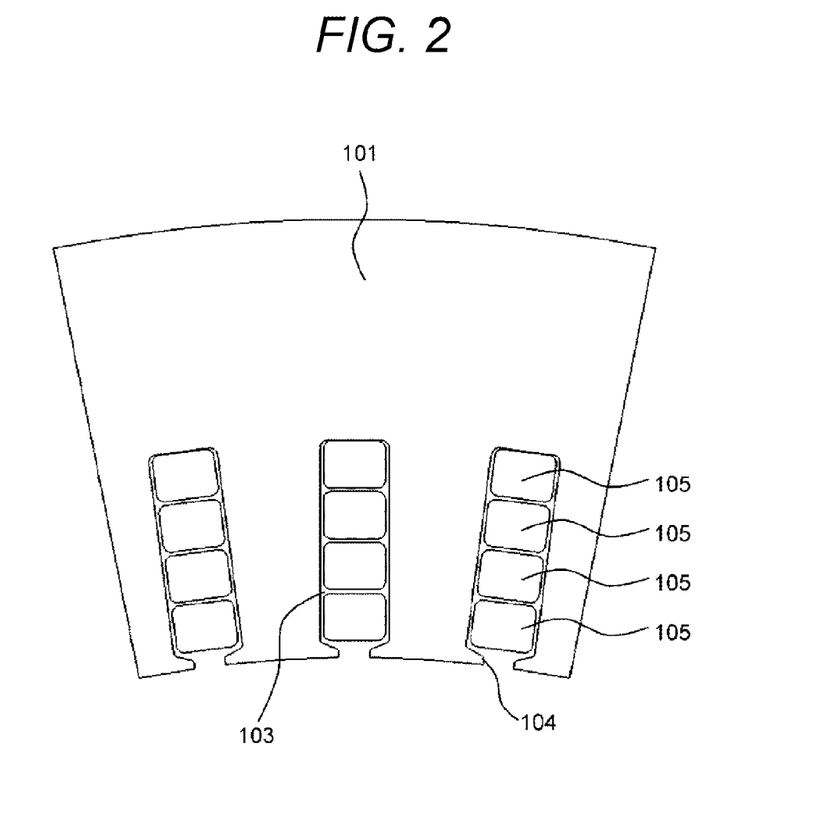
FIG. 2 is a cross-sectional view of a main part of a stator core according to the first embodiment.

FIG. 1 is a perspective view illustrating the stator of the rotating electric machine according to the first embodiment of the present invention alone. FIG. 2 is a cross-sectional view (horizontal cross-sectional view) of a main part of the stator core according to the first embodiment of the present invention, and is a cross-sectional view illustrating an inside of each slot 103.

As illustrated in FIGS. 1 and 2, a stator 100 of the rotating electric machine includes a stator core (also referred to as a stator core) 101 having a plurality of slots 103 formed on an inner circumferential side thereof, three stator windings (also referred to as segment coils) 102 corresponding to a U-phase, a V-phase, and a W-phase wound around the stator core 101, and a coil support member 201 that supports each stator winding 102. The stator core 101 is formed as a cylindrical housing, and the plurality of slots 103 is formed on the inner circumferential side of the housing. The slots 103 are formed to penetrate on the inner circumferential side of the stator core (housing) 101, as storage spaces for storing the stator windings 102, in the axial direction of the stator core 101, and are arranged (formed) at an equal interval in the circumferential direction at predetermined circumferential pitches. A slit 104 extending in the axial direction of the stator core 101 is formed on the inner circumferential side of each slot 103.

Each stator winding 102 according to the present embodiment is constituted by coil conductors 105 each having an insulating film, and includes a plurality of coil conductors 105 inserted into and held by the slots 103 as will be described below. The coil conductors 105 adjacent to each other within the same slot 103 are welded to each other at welding portions 106 provided at one end (a lower end of FIG. 1) of the stator core 101 in the axial direction. Accordingly, a long stator winding 102 in which the plurality of coil conductors 105 is electrically connected at the welding portions 106 is formed. In these coil conductors 105, a part of a portion to be joined (a lower side of the stator core 101 in the axial direction) extends outward of the slot 103 in the axial direction, and the insulating film of the entire circumference of the coil conductor 105 disposed on the portion to be joined is peeled off.

At this time, in the present embodiment, as will be described below, since the coil support member 201 is disposed (mounted) on an end portion of the stator core 101 in the axial direction and then the stator windings 102 (coil conductors 105) are wound around the stator core 101 via the coil support member 201, even though a part of the portion to be joined (the lower side of the stator core 101 in the axial direction) extends outward of the slot 103 in the axial direction, a creepage insulation distance between the stator core 101 and the stator windings 102 (coil conductors 105) can be ensured.

Figure 3:
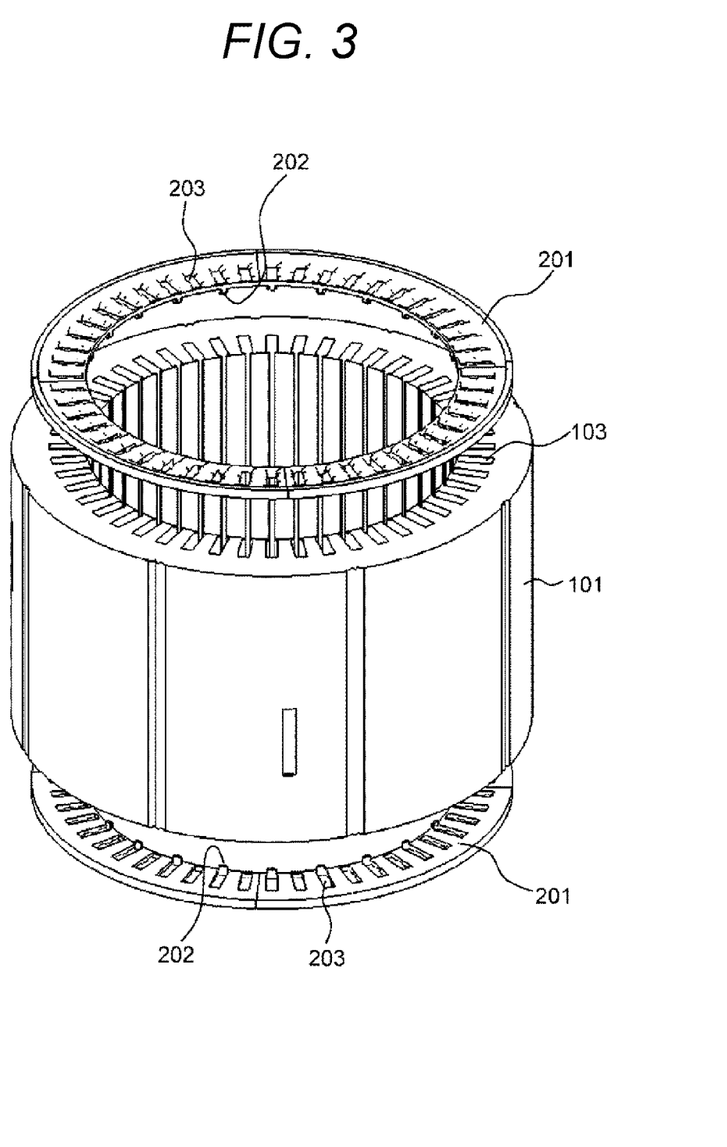
FIG. 3 is a perspective view illustrating a state before a coil support member is assembled to the stator core according to the first embodiment.

FIG. 3 is a perspective view illustrating a state before the coil support member is assembled to the stator core according to the first embodiment. FIG. 3 illustrates a positional relationship between the stator core 101 and the coil support member 201 for supporting (holding) the stator winding 102. The plurality of coil support members 201 for supporting (holding) the stator windings 102 is separately arranged at both end portions of the cylindrical stator core 101 in the axial direction. Each coil support member 201 is constituted by a member formed in an annular shape (ring shape) as a whole, and having a size that covers at least each slot 103 on the inner circumferential side of the end portion of the stator core 101 in the axial direction. A plurality of protrusion portions 202 inserted into the slots 103 is formed on the inner circumferential side of a surface of each coil support member 201 facing the end portion of the stator core 101 in the axial direction at an equal interval (at an interval of one slot) in the circumferential direction in order to position the coil support members with respect to the stator core 101. A plurality of through-holes (holes) 203 for inserting the stator windings 102 (coil conductors 105) which is openings connected to the slots 103 is formed on each coil support member 201 at an equal interval in the circumferential direction.

Although it has been described that each coil support member 201 according to the present embodiment divides a member formed in an annular shape (ring shape) into a plurality of members, for example, four members in the circumferential direction and the annular-shaped (ring-shaped) member is formed as whole by coupling these divided arc-shaped members, a member integrally molded in an annular shape may be used. When each of the divided arc-shaped members is used, the position accuracy between the stator core 101 and the coil support members 201 can be designed to be lower than that using the member integrally molded in the annular shape. Meanwhile, when the member integrally molded in the annular shape is used, it is necessary to design the positioning accuracy to be high such that each through-hole 203 of each coil support member 201 overlaps each slot 103 of the stator core 101. A material used for each coil support member 201 is made of PPS resin, but may be made of PET, PEEK, or a non-conductive metal.

Figure 4:
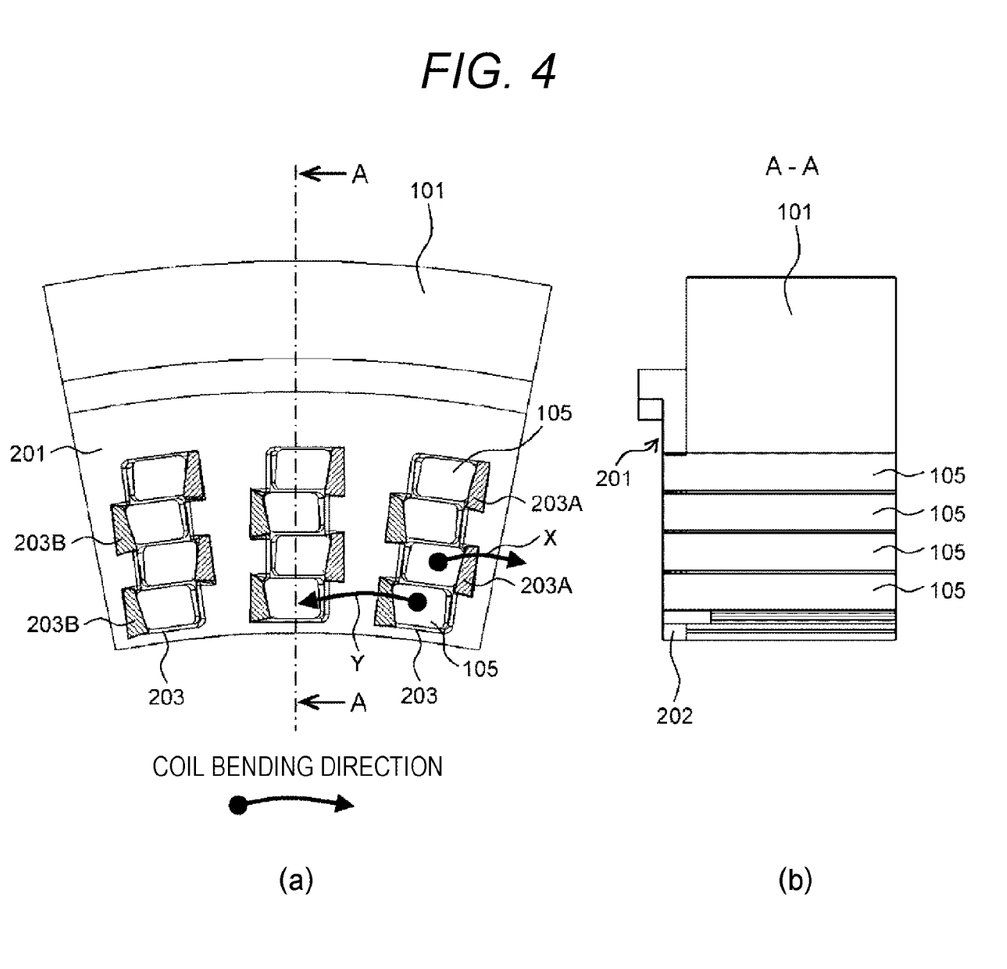
FIG. 4 is a diagram illustrating a state after the coil support member is assembled to the stator core according to the first embodiment.

FIG. 4 illustrates diagrams illustrating a state after the coil support member is assembled to the stator core according to the first embodiment, FIG. 4(a) is a top view, and FIG. 4(b) is cross-sectional view along a line A-A of FIG. 4(a). FIG. 4(b) illustrates a state in which the coil conductor 105 is cut in the axial direction such that a shape of the coil support member 201 can be easily understood. In FIG. 4, a plurality of recess portions 203A and 203B is formed at an edge of each through-hole (hole) 203 on an upper surface of each coil support member 201 so as to follow coil bending directions X and Y (circumferential direction). Usually, when the coil conductor 105 is twisted, since the adjacent coil conductors 105 are alternately bent in different directions within the slot 103, each recess portion 203A and each recess portion 203B are formed so as to be alternate in the radial direction. For example, among the edges of the through-hole (hole) 203, the recess portion 203A is formed at the edge corresponding to an insertion region of the coil conductor 105 in the coil bending direction X, and the recess portion 203B is formed at the edge corresponding to an insertion region of the coil conductor 105 in the coil bending direction Y.

At this time, each of the recess portions 203A and 203B is formed in a chamfered shape for holding the coil conductor 105, and is formed as a tapered portion of which a thickness is gradually changed from the edge of the through-hole (hole) 203 in the circumferential direction, for example, a tapered portion or a chamfered portion (groove portion) of which a depth is gradually shallow in the circumferential direction from the edge of the through-hole (hole) 203. Accordingly, when the coil conductor 105 is bent in the coil bending direction X or the coil bending direction Y, the coil conductor 105 can be bent without being damaged. Instead of the recess portions 203A and 203B, a tapered member (a tapered member of which a thickness is gradually increased in the circumferential direction) may be disposed at the edge of each through-hole (hole) 203. The edge of each through-hole (hole) 203 only needs to be simply chamfered. Each of the recess portions 203A and 203B may be formed on both sides of the edge of each through-hole (hole) 203 in the circumferential direction (direction intersecting with the radial direction).

Figure 5:
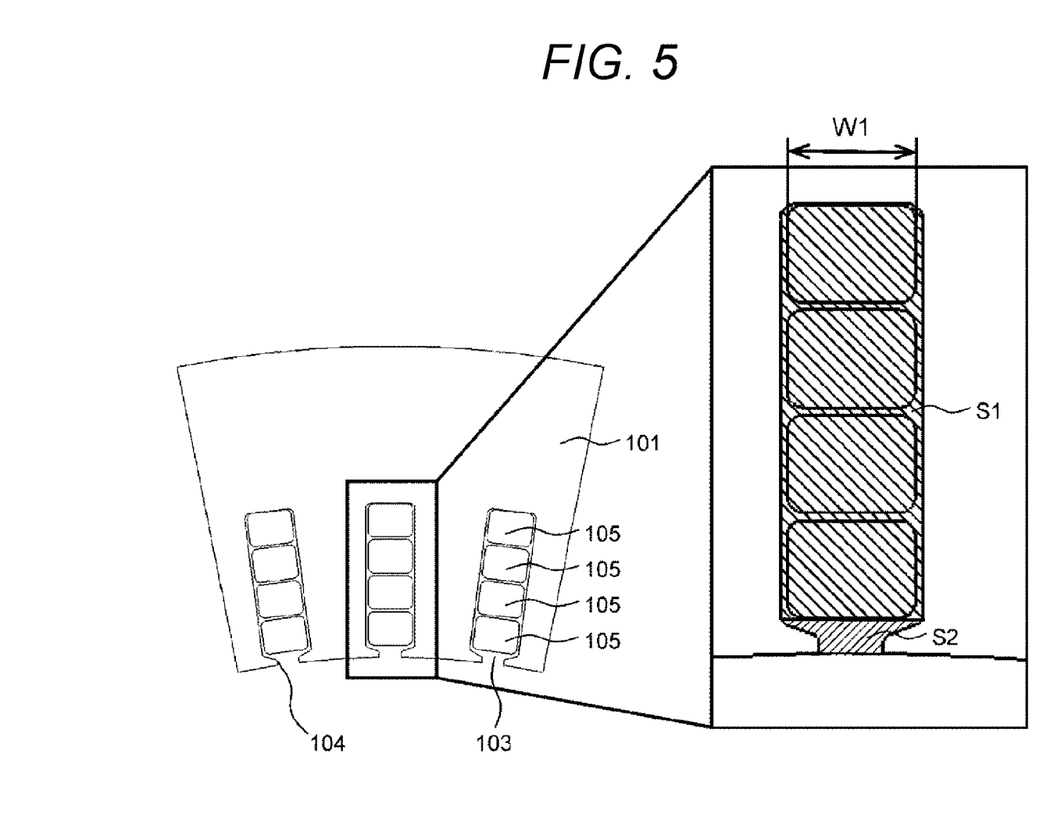
FIG. 5 is a conceptual diagram illustrating a slot region of the stator core according to the first embodiment.

FIG. 5 is a conceptual diagram for describing a slot region of the stator core according to the first embodiment, and illustrates the slot region of the stator core in which the protrusion portions formed on the coil support member are arranged. In FIG. 5, a size (area) of the slot 103 formed in the stator core 101 on a surface of the stator core 101 is formed larger than a width W1 of the coil conductor 105, and the slot region can be divided into a first space S1 having a size with which a designated number of coil conductors 105, for example, the four coil conductors 105 can be stored and a second space S2 communicatively connected to the first space S1. At this time, the second space S2 is a dead space (gap) after the four coil conductors 105 are inserted into the slots 103, and is a space into which the protrusion portions 202 of the coil support member 201 are inserted. The protrusion portions 202 of the coil support members 201 are inserted into the second space S2, and thus, the coil support members 201 are positioned on the stator core 101. Further, the coil support members 201 can be prevented from moving from the surface of the stator core 101. With this configuration, the positioning accuracy between the stator core 101 and the coil support members 201 can be ensured without reducing a space factor which is a ratio of the coil conductors 105 in the slot 103 of the stator core 101. In the slot 103, since the first space S1 is formed to be larger than the width W1 of the coil conductor 105, the coil conductor 105 having a designated thickness can be used.

Figure 6:
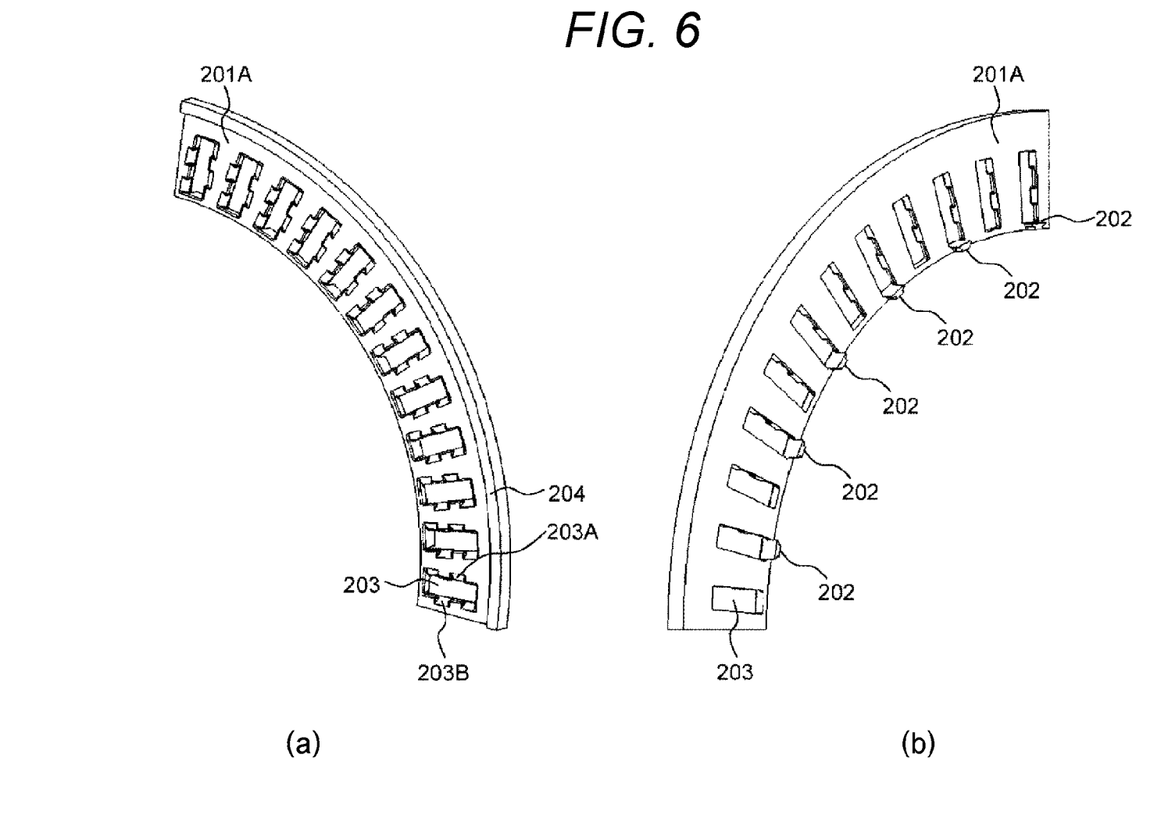
FIG. 6 is a perspective view of a main part of a split-type coil support member according to the first embodiment.

FIG. 6 illustrates perspective views of a main part of a split-type coil support member according to the first embodiment, FIG. 6(a) is a top view, and FIG. 6(b) is a bottom view. A split-type coil support member 201A is an arc-shaped member obtained by dividing the coil support member 201 formed in an annular shape (ring shape) into four in the circumferential direction. The annular coil support member 201 is formed by combining the four split-type coil support members 201A in the circumferential direction. A plurality of through-holes (holes) 203 for inserting the stator windings 102 (coil conductors 105) which is openings connected to the slots 103 is formed on the split-type coil support member 201A at an equal interval in the circumferential direction. The plurality of protrusion portions 202 inserted into the second space S2 of the slot 103 is formed on the lower surface (the surface facing the end portion of the stator core 101 in the axial direction) of the split-type coil support member 201A at an equal interval (at an interval of one slot) in the circumferential direction in order to position the split-type coil support members with respect to the stator core 101. Although the protrusion portions 202 according to the first embodiment are arranged at an interval of one slot, the protrusion portions 202 may be formed at portions corresponding to all the slots 103. An annular rib 204 for relaxing stress applied when the coil conductor 105 is formed by twisting is formed on an upper surface of the outer circumferential side of the split-type coil support member 201A in the circumferential direction.

According to the present embodiment, the creepage insulation distance between the stator core 101 and the stator windings 102 (coil conductors 105) can be ensured, and the coil conductors 105 can be bent without being damaged. Accordingly, it is possible to improve insulation reliability. The positioning accuracy between the stator core 101 and the coil support members 201 can be improved. Since the plurality of protrusion portions 202 is formed at an interval of one slot in the circumferential direction, the coil support members and the stator core can be more easily positioned than in a case where the protrusion portions 202 are inserted into the second space S2 of the slot 103 and the protrusion portions 202 are formed at the edges of all the through-holes (holes) 203 when the coil support members 201 are assembled to the stator core 101.

Second Embodiment

Figure 7:
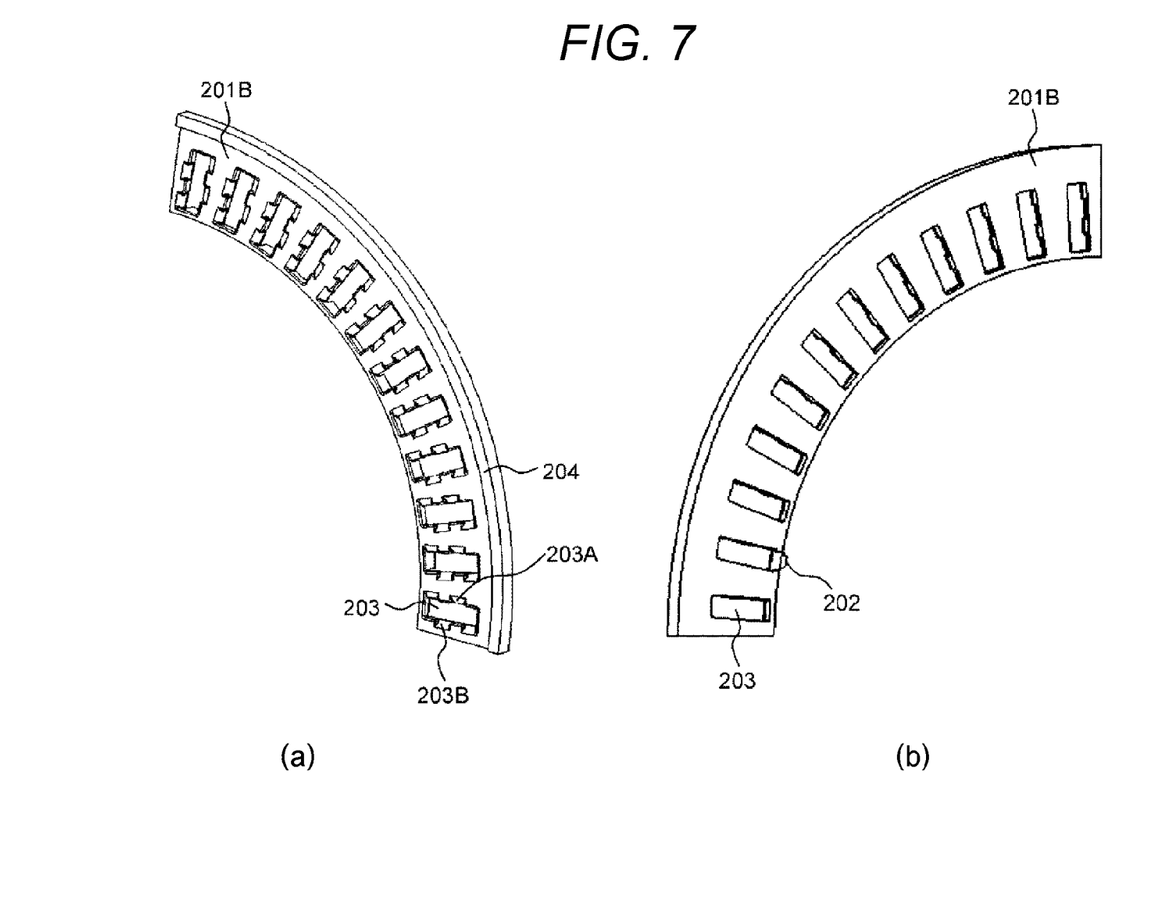
FIG. 7 is a perspective view of a split-type coil support member according to a second embodiment.

FIG. 7 illustrates perspective views of a split-type coil support member according to a second embodiment, FIG. 7(a) is a top view, and FIG. 7(b) is a bottom view. The second embodiment uses a split-type coil support member 201B instead of the split-type coil support member 201A. Other configurations are the same as those of the first embodiment, and the description thereof will be omitted.

The split-type coil support member 201B is an arc-shaped member obtained by dividing the coil support member 201 formed in an annular shape (ring shape) into four in the circumferential direction. The annular coil support member 201 is formed by combining the four split-type coil support members 201B in the circumferential direction. A plurality of through-holes (holes) 203 for inserting the stator windings 102 (coil conductors 105) which is openings connected to the slots 103 is formed on the split-type coil support member 201B at an equal interval in the circumferential direction. One protrusion portion 202 inserted into the second space S2 of the slot 103 is formed on the lower surface (the surface facing the end portion of the stator core 101 in the axial direction) of the split-type coil support member 201B in order to position the split-type coil support members with respect to the stator core 101. That is, the protrusion portion 202 is formed only at the edge of the single through-hole (hole) 203.

According to the present embodiment, since the protrusion portion 202 is formed only at the edge of the single through-hole (hole) 203, both the coil support members and the stator core can be more easily positioned than in the first embodiment when the protrusion portion 202 is inserted into the second space S2 of the slot 103 and the coil support members 201 are assembled to the stator core 101.

Third Embodiment

Figure 8:
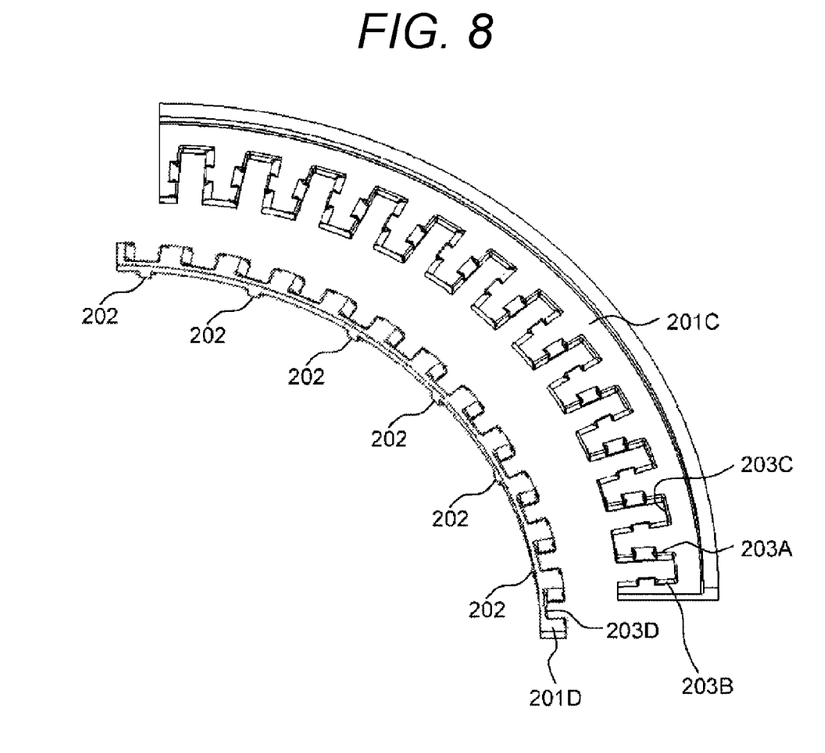
FIG. 8 is an exploded perspective view of a split-type coil support member according to a third embodiment.

FIG. 8 is an exploded perspective view of split-type coil support members according to a third embodiment. The third embodiment uses a combination of split-type coil support members 201C and D instead of the split-type coil support member 201A. Other configurations are the same as those of the first embodiment, and the description thereof will be omitted.

The split-type coil support members 201C and D are members obtained by dividing an arc-shaped member, which is obtained by dividing the coil support member 201 formed in an annular shape (ring shape) into four in the circumferential direction, into two in the radial direction. The annular coil support member 201 is formed by combining the split-type coil support member 201C and the split-type coil support member D and combining the four combined split-type coil support members 201C and split-type coil support members D in the circumferential direction.

The split-type coil support member 201C is a member disposed on the outer circumferential side (outer diameter side) of the stator core 101, and a plurality of notches 203C for inserting the stator windings 102 (core conductors 105) which is openings connected to the slots 103 is formed on the inner circumferential side (inner diameter side) of the split-type coil support member 201C at an equal interval in the circumferential direction. A plurality of recess portions 203A and 203B is formed on the edge of each notch 203C.

The split-type coil support member 201D is a member disposed on the inner circumferential side (inner diameter side) of the stator core 101, and a plurality of notches 203D for inserting the stator windings 102 (core conductors 105) which is openings connected to the slots 103 is formed on the outer circumferential side of the split-type coil support member 201D at an equal interval in the circumferential direction. The plurality of protrusion portions 202 inserted into the second space S2 of the slot 103 is formed on the lower surface (the surface facing the end portion of the stator core 101 in the axial direction) of the split-type coil support member 201D at an equal interval (at an interval of one slot) in the circumferential direction in order to position the split-type coil support members with respect to the stator core 101.

At this time, the slot is formed as an opened slot (a slot having a uniform slot width) without having the slit 104 instead of forming the slot 103 as a semi-closed slot having the slit 104, and thus, the coil conductors 105 can be inserted into the opened slot in the radial direction (lateral direction). Each notch 203C and each notch 203D function as the through-holes (holes) 203 by combining the split-type coil support member 201C and the split-type coil support member D.

According to the present embodiment, since the coil support member 201 is divided into two of the split-type coil support member 201C disposed on the outer diameter side and the split-type coil support member 201D disposed on the inner diameter side in the radial direction, the coil support member can also be applied to winding methods such as wave winding and continuous winding.

The present invention is not limited to the aforementioned embodiments, and includes various modification examples. For example, the aforementioned embodiments are described in detail in order to facilitate easy understanding of the present invention, and are not limited to necessarily include all the described components. In addition, the components of another embodiment can be added, removed, and substituted to, from, and into some of the components of the aforementioned embodiments.

REFERENCE SIGNS LIST 100 stator
101 stator core
102 stator winding
103 slot
104 slit
105 coil conductor
106 welding portion
201 coil support member
201A, 201B, 201C, 201D split-type coil support member
202 protrusion portion
203 through-hole
203A, 203B recess portion
203C, 203D notch
204 rib

The invention claimed is:

1. A stator for a rotating electric machine, comprising:
a stator core that is formed as a housing, and is configured such that storage spaces for storing a plurality of segment coils are formed on an inner circumferential side of the housing in an axial direction of the housing and the storage spaces are formed at intervals on the inner circumferential side of the housing; and
a coil support member that is formed as an annular member, and supports the plurality of segment coils,
wherein the coil support member includes a plurality of through-holes for inserting the segment coils, which are openings connected to the storage spaces, and the coil support member covers the inner circumferential side of an end portion of the stator core in the axial direction,
wherein each storage space includes a first space into which a designated number of segment coils as the segment coil are insertable and a second space which is communicatively connected to the first space and is a gap after the designated number of segment coils are inserted into the first space, and
the coil support member includes a protrusion portion that is insertable into a second space of the second spaces, which is formed on a radially inner circumferential side of the stator core, on a surface facing the end portion of the stator core in the axial direction.

2. The stator for a rotating electric machine according to claim 1, wherein a tapered portion, of which a thickness is gradually changed in a circumferential direction of the coil support member, is formed at an edge of each through-hole of the coil support member.

3. The stator for a rotating electric machine according to claim 1, wherein the protrusion portion is formed at the coil support member so as to correspond to some second spaces of the second spaces.

4. The stator for a rotating electric machine according to claim 1, wherein an annular rib is formed on an upper surface of an outer circumferential side of the coil support member in a circumferential direction.

5. The stator for a rotating electric machine according to claim 1, wherein the coil support member is configured to be dividable into a plurality of members in a circumferential direction, and the protrusion portions are formed at each divided split-type coil support member so as to correspond to some second spaces of the second spaces.

6. A stator for a rotating electric machine, comprising:
a stator core that is formed as a housing, and is configured such that storage spaces for storing a plurality of segment coils are formed on an inner circumferential side of the housing in an axial direction of the housing and the storage spaces are formed at intervals on the inner circumferential side of the housing; and
a coil support member that is formed as an annular member, and supports the plurality of segment coils,
wherein the coil support member includes a plurality of through-holes for inserting the segment coils, which are openings connected to the storage spaces, and the coil support member covers the inner circumferential side of an end portion of the stator core in the axial direction, and
wherein the coil support member is configured to be dividable into a plurality of members in a radial direction.

* * * * *